United States Patent
Brandt et al.

[11] Patent Number: 5,999,285
[45] Date of Patent: Dec. 7, 1999

[54] POSITIVE-OPERATOR-VALUED-MEASURE RECEIVER FOR QUANTUM CRYPTOGRAPHY

[75] Inventors: Howard E. Brandt, Silver Spring, Md.; John M. Myers, Boston, Mass.

[73] Assignee: The United States of America as represented by the Secretary of the Army, Washington, D.C.

[21] Appl. No.: 08/863,099

[22] Filed: May 23, 1997

[51] Int. Cl.[6] .............................. H04B 10/00; H04K 1/02; H04L 9/00
[52] U.S. Cl. .............................. 359/112; 380/21; 380/9
[58] Field of Search .................................... 359/189, 193, 359/192, 112; 380/21

[56] References Cited

U.S. PATENT DOCUMENTS

| | | |
|---|---|---|
| 5,243,649 | 9/1993 | Franson . |
| 5,307,410 | 4/1994 | Bennett . |
| 5,339,182 | 8/1994 | Kimble et al. . |
| 5,414,771 | 5/1995 | Fawcett, Jr. . |
| 5,515,438 | 5/1996 | Bennett et al. . |
| 5,764,765 | 6/1998 | Phoenix et al. ........................ 380/21 |

OTHER PUBLICATIONS

Unambiguous Quantum Measurement of Nonorthogonal States, B. Huttner, A. Muller, J.D. Gautier, H. Zbinden and N. Gisin, The American Physical Society, vol. 54, No. 5, Nov. 1996.

Eavesdropping on Quantum–Cryptographical Systems, Artur K. Ekert, Bruno Huttner, G. Massimo Palma and Asher Peres, vol. 50, No. 2, Aug. 1994.

*Primary Examiner*—Jason Chan
*Assistant Examiner*—Dalzid Singh
*Attorney, Agent, or Firm*—Paul S. Clohan, Jr.; Mark D. Kelly; William E. Eshelman

[57] ABSTRACT

Quantum key distribution (QKD) employs non-orthogonal quantum states to distribute a random bit sequence between two users for use as a provably secure key for encryption and authentication. The key generation procedure involves the transmission, interception, and reception of two nonorthogonal photon polarization states. At the receiving end, a positive-operator-valued measure (POVM) is employed in the measurement process. The invention is a receiver that is an all-optical realization of the POVM and includes a Wollaston prism, a mirror, two beam splitters, a polarization rotator, and three photodetectors.

1 Claim, 1 Drawing Sheet

POSITIVE-OPERATOR-VALUED-MEASURE RECEIVER FOR QUANTUM CRYPTOGRAPHY

BACKGROUND OF THE INVENTION

This invention is germane to secure communication by means of photonic signals in which the quantum mechanical uncertainty principle is exploited to guarantee that legitimate users can remain confident that a cryptographic key (random bit sequence) distributed over their communication system remains secret in the presence of eavesdropping.

With a secret cryptographic key, two users can (1) make their messages to each other undecipherable by an eavesdropper by means of one-time-pad encryption, and (2) successfully distinguish legitimate messages from modified ones by means of informationally secure mathematical authentication methods. However, it is well known that for secure one-time-pad encryption the key must be (1) as long as the plain text, (2) truly random, (3) secure, and (4) never reused. Mathematical authentication methods such as Wegman-Carter authentication (N. N. Wegman and J. L. Carter, J. of Computer and Syst. Sci. 22, 265, 1981) also consume key information and do not allow re-use of the key.

One method of distributing the key is by carrying between the two users a bulk-material storage medium such as magnetic tape on which a copy of the fresh key is recorded. The two legitimate users must both have copies of the key, and the key must be continually protected from inspection, both during its transport between the two users, and during the entire time from its generation until its use for encryption or authentication and subsequent immediate destruction. Because of the severe logistic problems of key distribution and storage, mathematical techniques for key agreement over an unprotected channel are often used, however, the secrecy of the key is based on unproven assumptions such as the unlikelihood of successfully factoring very large numbers.

Quantum key distribution (QKD) enables two users to secretly share a cryptographic key when needed with provable security arising from the quantum mechanical uncertainty principle (a thoroughly tested physical law). No bulk medium such as magnetic tape is exchanged, but instead, a communication channel is employed that can transmit signals consisting of nonorthogonal quantum states, such as single-photon phase or polarization states. Such signals cannot be accurately monitored by an eavesdropper, because of the quantum mechanical uncertainty principle. Any attempt to monitor them will disturb them and can be detected by the legitimate users of the channel.

Practical methods for QKD were introduced by Bennett et. al. (IBM Technical Disclosure Bulletin 28, 3153–3163, 1985; J. of Cryptology 5, 3–28, 1992). Bennett also proposed a photonic interferometric version of QKD (Phys. Rev. Lett. 68, 3121–3124, 1992). Other implemetations of QKD using photon phase states have been achieved by S. J. Phoenix et. al. (Contemporary Physics 36, 165–195, 1995) and R. J. Hughes et. al. (Contemporary Physics 36, 149–163, 1995). QKD using nonorthogonal photon polarization states in two different bases has been implemented by J. D. Franson et. al. (Applied Optics 33, 2949–2954, 1994).

In each of the QKD schemes, the sender and receiver also exchange information through an unprotected public channel, as part of the secure key distribution process, and also to allow determination of key distribution errors arising from possible eavesdropping and noise. If the disturbance is sufficiently small, the key can be distributed to produce with high probability a smaller amount of secure random key information.

Some related U.S. Pat. Nos. include 5,515,438 to Bennett et al; 5,243,649 to Franson; 5,307,410 to Bennett; and 5,339,182 to Kimble et al.

For the purpose of secure key generation in quantum cryptography, one can employ a train of single photons having two possible equally likely nonorthogonal polarization states $|u>$ and $|v>$, which encode 0 and 1, respectively, to securely communicate a random bit sequence between a sender (Alice) and a receiver (Bob) in the presence of an eavesdropper (Eve).

Recently Ekert et al (see reference 1, which is hereby expressly incorporated by reference) presented an analysis of an entangled translucent eavesdropping scenario of key generation in quantum cryptography. The present invention uses two nonorthogonal photon polarization states. The eavesdropping is translucent in the sense that the eavesdropper Eve perturbs the polarization of the carrier on its way to Bob. The eavesdropper uses a probe that causes the carrier states to become entangled with the probe states.

For detection, Eve makes an information-maximizing von Neumann-type projective measurement, and Bob uses a positive operator valued measure (POVM). Bennett's two-state protocol (see reference 2, which is hereby expressly incorporated by reference) is employed, in which a positive response of Bob's POVM receiver, indicating the reception of a photon in a u-polarization or a v-polarization state, is publicly communicated to Eve without revealing which polarization was detected, and the corresponding bits then constitute the preliminary key secretly shared by Alice and Bob. Bits corresponding to photons that do not excite the u- or v-polarization state detectors are excluded from the key. Because of the noncommutativity of nonorthogonal photon polarization-measurement operators representing nonorthogonal photon polarization states, and also because arbitrary quantum states cannot be cloned (see references 3 and 4), any attempt by Eve to eavesdrop can in principle be detected by Bob and Alice.

The present invention is a new design for the POVM receiver to be used by Bob. It is the first implementation of a POVM in quantum cryptography. The design is totally optical. Because it is also interferometric, it demands precise phase alignment; however, it faithfully represents the perturbed statistics resulting from entangled translucent eavesdropping. Additional analysis pertaining to the device appears in Myers et al (see reference 5).

SUMMARY OF THE INVENTION

It is an object of the present invention to provide a positive-operator-valued measure receiver for use in, for example, quantum cryptography.

This and other objects of the invention are achieved by a positive-operator-valued-measure receiver, comprising a Wollaston prism for receiving a photon having a polarization state $|\psi>$ given by $|\psi> = \alpha|u> + \beta|v>$, where $\alpha$ and $\beta$ are arbitrary real constants and the polarization of state $|u>$ makes an angle $\theta$ with that of state $|v>$; wherein the photon exits the Wollaston prism in a state $|\psi_1> = 2^{-1/2}(\alpha+\beta)(1+\cos\theta)^{1/2}|\hat{e}_{u+v}>$ for the path between the Wollaston prism and a first beam splitter, and a state $|\psi_2> = 2^{-1/2}(\alpha-\beta)(1-\cos\theta)^{1/2}|\hat{e}_{u-v}>$ for the path between the Wollaston prism and a mirror, where $|\hat{e}_{u+v}>$ and $|\hat{e}_{u-v}>$ denote unit kets corresponding to polarization vectors $\hat{e}_{u+v}$ and $\hat{e}_{u-v}$, respectively; the first beam splitter for receiving the photon in the state $|\psi_1>$ and having a reflection coefficient of $\tan^2(\theta/2)$; wherein the photon exits the first beam splitter in a transmitted state of $|\psi_3(\alpha+\beta)(\cos\theta)^{1/2}|\hat{e}_{u+v}>$ corresponding to the path between the first beam splitter and a first photodetector, and a reflected state of $|\psi_4\rangle = i2^{-1/2}(\alpha+\beta)(1-\cos\theta)^{1/2}|\hat{e}_{u+v}\rangle$ corresponding to the path between the first beam splitter and a second beam splitter; the first photodetector for detecting the photon in the state $|\psi_3\rangle$ corresponding to an inconclusive event; the mirror for receiving the photon in the state $|\psi_2\rangle$ and reflecting the photon therefrom; a ninety degree polarization rotator for receiving the photon reflected from the mirror and rotating the photon polarization to a state $|\psi_5\rangle = -2^{1/2}(\alpha-\beta)(1-\cos\theta)^{1/2}|\hat{e}_{u+v}\rangle$; the second beam splitter having a reflection coefficient of 0.5; the second beam splitter for receiving a photon in the state $|\psi_4\rangle$ from the first beam splitter and the state $|\psi_5\rangle$ from the ninety degree polarization rotator wherein both optical path lengths from the Wollaston prism to the second beamsplitter are equal; and wherein the photon exits the second beam splitter in a state $|\psi_6\rangle = -\alpha(1-\cos\theta)^{1/2}|\hat{e}_{u+v}\rangle$ corresponding to the path between the second beam splitter and a second photodetector, and a state $|\psi_7\rangle = i\beta(1-\cos\theta)^{1/2}|\hat{e}_{u+v}\rangle$ corresponding to the path between the second beam splitter and a third photodetector; and the second and third photodetectors for detecting photons in the states $|\psi_6\rangle$ corresponding to an incident u-polarized photon and $|\psi_7\rangle$ corresponding to an incident v-polarized photon, respectively.

Further objects, features and advantages of the invention will become apparent from the following detailed description taken in conjunction with the drawing.

DETAILED DESCRIPTION OF THE PREFERRED EMBODIMENTS

Figure 1:
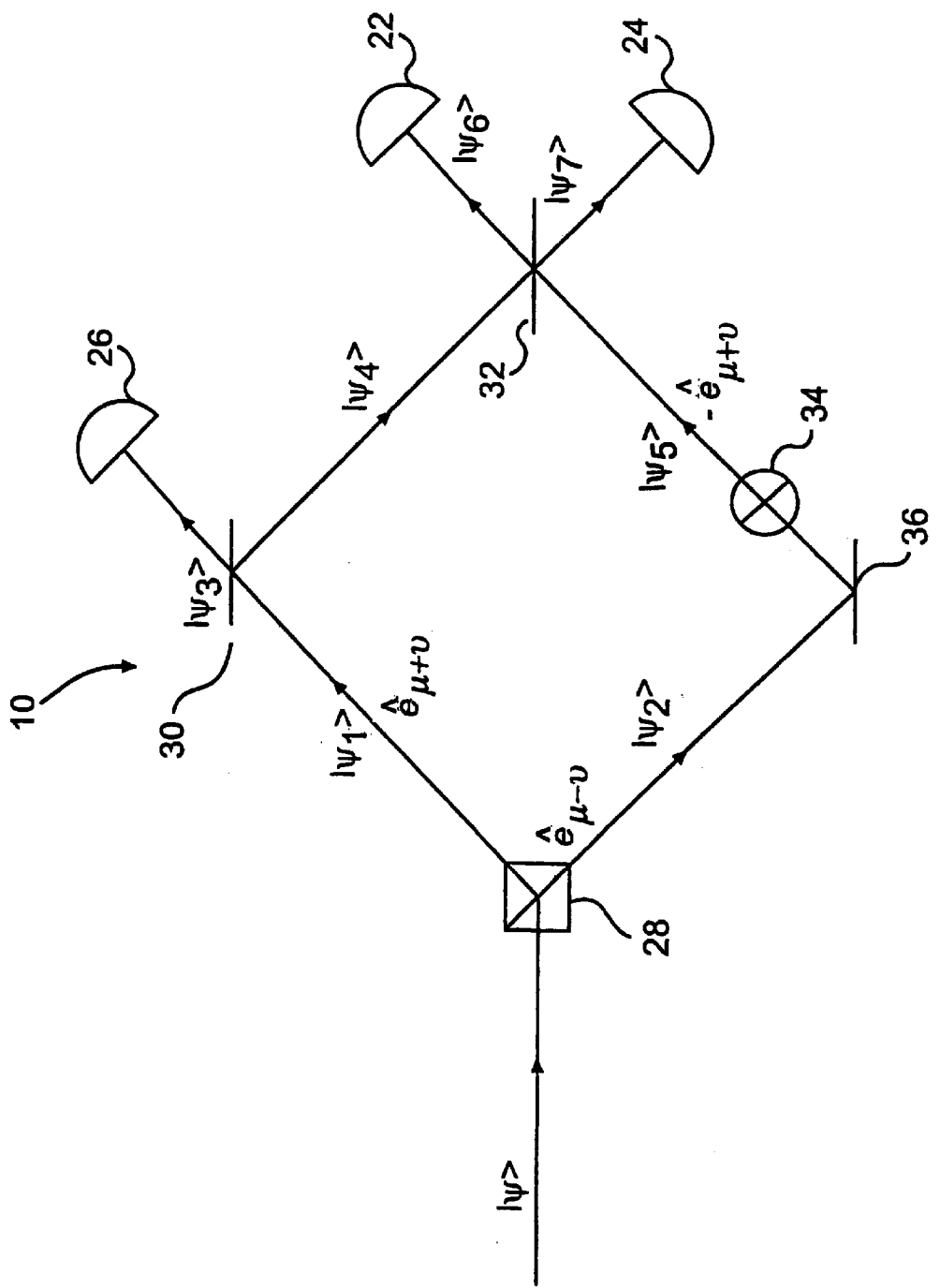
FIG. 1 schematically shows the POVM receiver of the present invention.

The positive-operator-valued measure (see references 7-14), also known as the probability operator valued measure, is finding increasing use in quantum cryptography. In the work of Ekert et al (reference 1) on entangled translucent eavesdropping, the following set of POVM operators represents the possible measurements performed by Bob's receiver:

$$A_u = (1 + \langle u|v\rangle)^{-1}(1 - |v\rangle\langle v|), \qquad (1)$$

$$A_v = (1 + \langle u|v\rangle)^{-1}(1 - |u\rangle\langle u|), \qquad (2)$$

$$A_? = 1 - A_u - A_v. \qquad (3)$$

Here kets $|u\rangle$ and $|v\rangle$ represent the two possible nonorthogonal normalized polarization states of the carrier, with polarizations designated by u and v, respectively. The angle between the corresponding polarization vectors is $\theta$, from which it follows (from the spin-1 behavior of the photon under the rotation group) that the overlap between the two states is $$\langle u|v\rangle = \cos\theta. \qquad (4)$$

The state $|u\rangle$ encodes bit value 0, and the state $|v\rangle$ encodes bit value 1. The POVM operators, Eqs. (1) to (3), are positive, and their sum is unity. They are appropriate for realizing Bennett's two-state protocol because $$\langle u|A_u|v\rangle = 0, \qquad (5)$$

and $$\langle u|A_v|u\rangle = 0. \qquad (6)$$

Therefore, when an ideal detector representing the operator $A_u$ responds positively, it follows that a photon with a v-polarization state cannot have been received. Likewise, when an ideal detector representing the operator $A_v$ responds, a photon with a u-polarization state cannot have been received. The operator $A_?$ represents inconclusive responses of Bob's receiver. A u-polarized photon can result in a nonzero expectation value (and the associated response) only for the detectors representing $A_u$ or $A_?$ operators. A v-polarized photon excites only the $A_v$ or $A_?$ detectors. The advantage of the POVM over the von Neumann type of projective measurement[2] is that for the POVM, the probability of getting an inconclusive result is lower.[1]

For an arbitrary polarization state $|\psi\rangle$ of a photon, given by $$|\psi\rangle = \alpha|u\rangle + \beta|v\rangle, \qquad (7)$$

where $\alpha$ and $\beta$ are arbitrary real constants, the expectation values of the POVM operators become $$\langle\psi|A_u|\psi\rangle = \alpha^2(1-\cos\theta), \qquad (8)$$

$$\langle\psi|A_v|\psi\rangle = \beta^2(1-\cos\theta), \qquad (9)$$

$$\langle\psi|A_?|\psi\rangle = (\alpha+\beta)^2 \cos\theta. \qquad (10)$$

For the case of a transmitted state $|u\rangle$ in the two-state protocol, in the absence of perturbations, one has $(\alpha,\beta)=(1,0)$ in Eq. (7), and Eqs. (8) to (10) become $$\langle u|A_u|u\rangle = (1-\cos\theta), \qquad (11)$$

$$\langle u|A_v|u\rangle = 0, \qquad (12)$$

$$\langle u|A_?|u\rangle = \cos\theta, \qquad (13)$$

consistent with Eq. (6). Alternatively, if $(\alpha,\beta)=(0,1)$, then $$\langle v|A_u|v\rangle = 0, \qquad (14)$$

$$\langle v|A_v|v\rangle = (1-\cos\theta), \qquad (15)$$

$$\langle v|A_?|v\rangle = \cos\theta, \qquad (16)$$

consistent with Eq. (5). Either alternative is equally likely in the unperturbed two-state protocol. Although the POVM measurement scheme in quantum cryptography has been described mathematically in the literature, no concrete physical model has been provided. The present invention is a physical realization for the POVM receiver.

The circuit design for the POVM receiver 10 of the present invention is shown in FIG. 1. It is an all-optical device. The straight lines with arrows represent possible optical pathways for a photon to move through the device 10. The path labeled $|\psi\rangle$ is the incoming path for a photon represented by the arbitrary polarization state given by Eq. (7). Reference numerals 22, 24 and 26 designate photodetectors $D_u$, $D_v$, and $D_?$, respectively, which represent the measurement operators $A_u$, $A_v$, and $A_?$, respectively. Shown also is a Wollaston prism 28, which is aligned so that an incident photon with polarization vector $\hat{e}_{u+v}$ would take the path labeled by the state $|\psi_1\rangle$ and $\hat{e}_{u+v}$, and not the path labeled by polarization vector $\hat{e}_{u-v}$ and $|\psi_2\rangle$. Here $\hat{e}_{u+v}$ denotes a unit polarization vector corresponding to polarization state $|u+v\rangle = |u\rangle + |v\rangle$, and is perpendicular to the unit polarization vector $\hat{e}_{u-v}$ corresponding to the polarization state $|u-v\rangle = |u\rangle - |v\rangle$. The states $|u+v\rangle$ and $|u-v\rangle$ are orthogonal, and one has $$\langle u+v|u-v\rangle = 0, \quad \hat{e}_{u+v}\cdot\hat{e}_{u-v} = 0. \qquad (17)$$

The device 10 also has two beam splitters designated by 30 and 32 in FIG. 1. Beam splitter 32 is a 50/50 beam splitter for a photon entering either of its entrance ports. The device 10 is clearly interferometric. Also shown in FIG. 1 is a 90° polarization rotator designated by 34, which transforms a photon with polarization vector $\hat{e}_{u-v}$ into one with polarization vector $-\hat{e}_{u+v}$. Also shown in FIG. 1 is a single mirror 36.

It follows from the geometry of FIG. 1 and the projective property of polarized photon states, Eq. (4), that the state of a photon taking the path designated by the state $|\psi_1\rangle$ is given by $$|\psi_1\rangle = (\alpha\langle u| + \beta\langle v|)\left(\frac{|u\rangle + |v\rangle}{\||u\rangle + |v\rangle\|}\right)|\hat{e}_{u+v}\rangle, \qquad (18)$$

where $|\hat{e}_{u+v}\rangle$ represents a unit ket corresponding to polarization vector $\hat{e}_{u+v}$. Also in Eq. (18), the Dirac bracket, appearing as an overall factor of the unit ket, is the probability amplitude that a photon takes the path under consideration. Analogously, one has $$|\psi_2\rangle = (\alpha\langle u| + \beta\langle v|)\left(\frac{|u\rangle + |v\rangle}{\||u\rangle - |v\rangle\|}\right)|\hat{e}_{u-v}\rangle, \qquad (19)$$

where $|\hat{e}u-v\rangle$ represents a unit ket corresponding to polarization vector $\hat{e}_{u-v}$. Expanding Eqs. (18) and (19), using Eq. (4), we obtain $$|\psi_1\rangle = 2^{-1/2}(\alpha+\beta)(1+\cos\theta)^{1/2}|\hat{e}_{u+v}\rangle \qquad (20)$$

and $$|\psi_2\rangle = 2^{-1/2}(\alpha-\beta)(1-\cos\theta)^{1/2}|\hat{e}_{u-v}\rangle. \qquad (21)$$

The detectors 22, 24 and 26 are treated here as ideal. We require $$\langle\psi_6|\psi_6\rangle = \langle\psi|A_u|\psi\rangle, \qquad (22)$$

in order that the expectation value of $A_u$, measured by the detector 22 in FIG. 1, equal the probability $\langle\psi_6|\psi_6\rangle$ that a photon is incident on it. This makes the POVM effectively a probability operator valued measure. Analogously, we require $$\langle\psi_7|\psi_7\rangle = \langle\psi|A_v|\psi\rangle \qquad (23)$$

for the detector 24, and $$\langle\psi_3|\psi_3\rangle = \langle\psi|A_\rightarrow|\psi\rangle \qquad (24)$$

for the detector 26. Substituting Eq. (10) in Eq. (24), we obtain $$\langle\psi_3|\psi_3\rangle = (\alpha+\beta)^2\cos\theta, \qquad (25)$$

and therefore $$|\psi_3\rangle = (\alpha+\beta)(\cos\theta)^{1/2}|\hat{e}_{u+v}\rangle. \qquad (26)$$

It can be shown, using the methods of Ref. 5, that one can effectively ignore the unused vacuum port of beam splitter 30, in complete agreement with physical intuition. From FIG. 1 one sees that in order for the state $|\psi_3\rangle$ of a photon to result from a photon in state $|\psi_1\rangle$ hitting the beam splitter 30, the transmission coefficient $T_1$ of beam splitter 30 must be given by $$T_1 = \frac{\langle\psi_3|\psi_3\rangle}{\langle\psi_1|\psi_1\rangle}, \qquad (27)$$

and therefore substituting Eqs. (25) and (20) in Eq. (27), one obtains $$T_1 = 1 - \tan^2(\theta/2), \text{ tm } (28)$$

independent of $\alpha$ and $\beta$. The corresponding reflection coefficient becomes $$R_1 = \tan^2(\theta/2), \qquad (29)$$

and from FIG. 1 one sees that $$\langle\psi_4|\psi_4\rangle = R_1\langle\psi_1|\psi_1\rangle. \qquad (30)$$

Substituting Eqs. (29) and (20) in Eq. (30), one obtains $$\langle\psi_4|\psi_4\rangle = \frac{1}{2}(\alpha+\beta)^2(1-\cos\theta). \qquad (31)$$

Next, taking account of the reflection at beam splitter 30 that introduces a factor of i, it therefore follows that $$|\psi_4\rangle = i2^{-1/2}(\alpha+\beta)(1-\cos\theta)^{1/2}|\hat{e}_{u+v}\rangle. \qquad (32)$$

Also one sees from the geometry of FIG. 1, together with Eq. (21), that, because of the polarization rotator 34, which effectively converts polarization in the direction $\hat{e}_{u-v}$ into that in the direction $-\hat{e}_{u+v}$, one has $$|\psi_5\rangle = -2^{-1/2}(\alpha-\beta)(1-\cos\theta)^{1/2}|\hat{e}_{u+v}\rangle. \qquad (33)$$

Next, from FIG. 1, one sees that because of beam splitter 32, states $|\psi_4\rangle$ and $|\psi_5\rangle$ combine and interfere to produce states $|\psi_6\rangle$ and $|\psi_7\rangle$. In particular, because beam splitter 32 is a 50/50 beam splitter with reflection coefficient $$R_2 = \frac{1}{2} \qquad (34)$$

and transmission coefficient $$T_2 = \frac{1}{2} \qquad (35)$$

for both entrance paths, one has $$|\psi_6\rangle = 2^{-1/2}|\psi_5\rangle + i2^{-1/2}|\psi_4\rangle \qquad (36)$$

and $$|\psi_7\rangle = 2^{-1/2}|\psi_4\rangle + i2^{-1/2}|\psi_5\rangle. \qquad (37)$$

The implementation of the interferometric Eqs. (36) and (37) demands precise phase alignment in the interferometric circuit of FIG. 1. Next, substituting Eqs. (32) and (33) in Eqs. (36) and (37), one obtains $$|\psi_6\rangle = -\alpha(1-\cos\theta)^{1/2}|\hat{e}_{u+v}\rangle \qquad (38)$$

and $$|\psi_7\rangle = i\beta(1-\cos\theta)^{1/2}|\hat{e}_{u+v}\rangle. \qquad (39)$$

From Eq. (38), it follows that $$\langle\psi_6|\psi_6\rangle = \alpha^2(1-\cos\theta), \qquad (40)$$

and comparing Eq. (40) with Eq. (8), one sees that $$\langle\psi_6|\psi_6\rangle = \langle\psi|A_u|\psi\rangle, \quad (41)$$

again consistent with FIG. 1 and the requirements for the POVM. Also from Eq. (39), it follows that $$\langle\psi_7|\psi_7\rangle = \beta^2(1-\cos\theta), \quad (42)$$

and comparing Eq. (42) with Eq. (9), one sees that $$\langle\psi_7|\psi_7\rangle = \langle\psi|A_v|\psi\rangle, \quad (43)$$

again consistent with FIG. 1. Furthermore, using Eqs. (25), (40), (42), (4), and (7), one concludes that $$\langle\psi_3|\psi_3\rangle + \langle\psi_6|\psi_6\rangle + \langle\psi_7|\psi_7\rangle = \langle\psi|\psi\rangle, \quad (44)$$

or equivalently, $$|\psi_3|^2 + |\psi_6|^2 + |\psi_7|^2 = |\psi|^2, \quad (45)$$

as required to conserve probability. Equations (24), (41), (43), and (45) are just the probabilistic properties one would expect of a POVM acting as a probability operator valued measure.

In conclusion, the POVM receiver 10 of FIG. 1 satisfies the appropriate statistics. Also, both beam-splitter transmission coefficients have the desirable feature that they do not depend on the coefficients $\alpha$ and $\beta$ associated with an arbitrary incoming polarization state, and therefore the device can also faithfully represent the perturbed statistics arising from entangled translucent eavesdropping.

In this work, we have presented a new design for a receiver that is an all-optical realization of a POVM for use in quantum cryptography. The device, depicted in FIG. 1, interferometrically implements the statistics of all three POVM operators.

While the invention has been described with reference to certain preferred embodiments, numerous changes, alterations and modifications to the described embodiments are possible without departing from the spirit and scope of the invention as defined in the appended claims, and equivalents thereof.

References:

1. A. K. Ekert, B. Huttner, G. M. Palma, and A. Peres, "Eavesdropping on Quantum-Cryptographical Systems," Phys. Rev. A 50, 1047 (1994).
2. C. H. Bennett, "Quantum Cryptography Using Any Two Nonorthogonal States," Phys. Rev. Lett. 68, 3121 (1992).
3. W. K. Wooters and W. H. Zurek, "A Single Quantum Cannot be Cloned,"Nature (London) 299, 802 (1982).
4. D. Dieks, "Communication by EPR Devices," Phys. Lett. 92A, 271 (1982).
5. J. M. Myers and H. E. Brandt, "Converting a Positive Operator-Valued Measure to a Design for a Measuring Instrument on the Laboratory Bench," submitted to Meas. Sci. Technol.(1997).
6. U. M. Maurer, "Secret Key Agreement by Public Discussion from Common Information," IEEE Trans. Inform. Theory 39, 733 (1993).
7. A. Peres, Quantum Theory: *Concepts and Methods*, Kluwer, Dordrecht (1993).
8. C. W. Helstrom, *Quantum Detection and Estimation Theory*, Academic Press, N.Y. (1976).
9. J. M. Jauch and C. Piron, "Generalized Localizability," Helv. Phys. Acta 40, 559 (1967).
10. E. B. Davies and J. T. Lewis, "An Operational Approach to Quantum Probability," Commun. Math. Phys. 17, 239 (1970).
11. E. B. Davies, *Quantum Theory of Open Systems*, Academic, N.Y. (1976).
12. P. A. Benioff, "Operator Valued Measures in Quantum Mechanics: Finite and Infinite Processes," J. Math. Phys. 13, 231 (1972).
13. P. Busch, P. J. Lahti, and P. Mittelstaedt, *The Quantum Theory of Measurement*, 2nd Ed., Springer, Berlin (1996).
14. P. Busch, M. Grabowski, and P. J. Lahti, *Operational Quantum Physics*, Springer (1995).
15. H. E. Brandt, J. M. Myers, and S. J. Lomonaco, Jr., "Entangled Translucent Eavesdropping in Quantum Cryptography," talk presented at OSA Symposium on Quantum Computing, Memory, and Communication, abstract published in Program, OSA Annual Meeting, Oct. 20–24, 1996, Rochester, N.Y., Optical Society of America (1996). 16. H. E. Brandt, "ARL Research on Quantum Information and Computation (Samples)," talk presented at The Quantum Information and Computing (QUIC) Workshop, California Institute of Technology, Pasadena, Calif., Nov. 13, 1996.
17. H. E. Brandt, "POVM Receivers for Quantum Cryptography," talk presented at Joint April Meeting of the American Physical Society and the American Association of Physics Teachers, Washington D.C., Apr. 18–21, 1997, Bull. Am. Phys. Soc. (1997).

What is claimed is:

1. A positive-operator-valued-measure receiver, comprising:

a Wollaston prism for receiving a photon having a polarization state $|\psi\rangle$ given by $|\psi\rangle = \alpha|u\rangle + \beta|v\rangle$, where $\alpha$ and $\beta$ are arbitrary real constants and the polarization of state $|u\rangle$ makes an angle $\theta$ with that of state $|v\rangle$; wherein the photon exits the Wollaston prism in a state $|\psi_1\rangle = 2^{-1/2}(\alpha+\beta)(1+\cos\theta)^{1/2}|\hat{e}_{u+v}\rangle$ for the path between the Wollaston prism and a first beam splitter and $|\psi_2\rangle = 2^{-1/2}(\alpha-\beta)(1-\cos\theta)^{1/2}|\hat{e}_{u-v}\rangle$ for the path between the Wollaston prism and a mirror, where $|\hat{e}_{u+v}\rangle$ and $|\hat{e}_{u-v}\rangle$ denote unit kets corresponding to polarization vectors $\hat{e}_{u+v}$ and $\hat{e}_{u-v}$, respectively;

the first beam splitter for receiving the photon in the state $|\psi_1\rangle$ and having a reflection coefficient of $\tan^2(\theta/2)$; wherein the photon exits the first beam splitter in a transmitted state of $|\psi_3\rangle = (\alpha+\beta)(\cos\theta)^{1/2}|\hat{e}_{u+v}\rangle$ corresponding to the path between the first beam splitter and a first photodetector, and a reflected state of $|\psi_4\rangle = i2^{-1/2}(\alpha+\beta)(1-\cos 74)^{1/2}|\hat{e}_{u+v}\rangle$ corresponding to the path between the first beam splitter and a second beam splitter;

the first photodetector for detecting the photon in the state $|\psi_3\rangle$ corresponding to an inconclusive event;

the mirror for receiving the photon in the state $|\psi_2\rangle$ and reflecting the photon therefrom;

a ninety degree polarization rotator for receiving the photon reflected from the mirror and rotating the photon polarization to a state $|\psi_5\rangle = -2^{-1/2}(\alpha-\beta)(1-\cos\theta)^{1/2}|\hat{e}_{u+v}\rangle$; the second beam splitter having a reflection coefficient of 0.5; the second beam splitter for receiving a photon in the state $|\psi_4\rangle$ from the first beam splitter and the state $|\psi_5\rangle$ from the ninety degree polarization rotator wherein both optical path lengths from the Wollaston prism to the second beam splitter are equal;

and wherein the photon exits the second beam splitter in a state $|\psi_6\rangle = -\alpha(1-\cos\theta)^{1/2}|\hat{e}_{u+v}\rangle$ corresponding to the path between the second beam splitter and a second photodetector, and $|\psi_7\rangle = i\beta(1-\cos\theta)^{1/2}|\hat{e}_{u+v}\rangle$ corresponding to the path between the second beam splitter and a third photodetector; and the second and third photodetectors for detecting photons in the states $|\psi_6\rangle$ corresponding to an incident u-polarized photon and $|\psi_7\rangle$ corresponding to an incident v-polarized photon, respectively.

* * * * *

UNITED STATES PATENT AND TRADEMARK OFFICE
CERTIFICATE OF CORRECTION

PATENT NO : 5,999,285

DATED : December 7, 1999

INVENTOR(S) : Brandt, et al.

It is certified that error appears in the above-identified patent and that said Letters Patent is hereby corrected as shown below:

The equation at Col. 2, lines 60-61 should read:

$$|\psi_2\rangle = 2^{-1/2}(\alpha-\beta)(1-\cos\theta)^{1/2}|\hat{e}_{u-v}\rangle$$

The equation at Col. 2, line 67 should read:

$$|\psi_3\rangle = (\alpha+\beta)(\cos\theta)^{1/2}|\hat{e}_{u+v}\rangle$$

Equation (1) at Col. 3, line 44 should read:

$$A_u = (1 + \langle u|v\rangle)^{-1}(1 - |v\rangle\langle v|), \tag{1}$$

Equation (2) at Col. 3, line 46 should read:

$$A_v = (1 + \langle u|v\rangle)^{-1}(1 - |u\rangle\langle u|), \tag{2}$$

Equation (5) at Col. 3, line 64 should read:

$$\langle v|A_u|v\rangle = 0, \tag{5}$$

Equation (8) at Col. 4, line 22 should read:

$$\langle\psi|A_u|\psi\rangle = \alpha^2(1 - \cos\theta), \tag{8}$$

Equation (13) at Col. 4, line 34 should read:

$$\langle u|A_?|u\rangle = \cos\theta, \tag{13}$$

UNITED STATES PATENT AND TRADEMARK OFFICE
CERTIFICATE OF CORRECTION

PATENT NO : 5,999,285
DATED : December 7, 1999
INVENTOR(S) : Brandt, et al.

It is certified that error appears in the above-identified patent and that said Letters Patent is hereby corrected as shown below:

Equation (16) at Col. 4, line 41 should read:

$$\langle v| A_7 |v\rangle = \cos\theta, \tag{16}$$

Equation (19) at Col. 5, line 23 should read:

$$|\psi_2\rangle = (\alpha\langle u| + \beta\langle v|)\left(\frac{|u\rangle - |v\rangle}{\||u\rangle - |v\rangle\|}\right)|\hat{e}_{u-v}\rangle, \tag{19}$$

The expression at Col. 5, line 26 should read:

$$\text{where } |\hat{e}_{u-v}\rangle \text{ represents}$$

Equation (24) at Col. 5, line 51 should read:

$$\langle\psi_3|\psi_3\rangle = \langle\psi| A_7 |\psi\rangle \tag{24}$$

Equation (28) at Col. 6, line 9 should read:

$$T_1 = 1 - \tan^2(\theta/2), \tag{28}$$

Equation (30) at Col. 6, line 17 should read:

$$\langle\psi_4|\psi_4\rangle = R_1\langle\psi_1|\psi_1\rangle. \tag{30}$$

The equation in claim 1 at Col. 8, lines 50-51 should read:

$$|\psi_4\rangle = i2^{-1/2}(\alpha + \beta)(1 - \cos\theta)^{1/2}|\hat{e}_{u+v}\rangle$$

UNITED STATES PATENT AND TRADEMARK OFFICE
CERTIFICATE OF CORRECTION

Page 3 of 3

PATENT NO. : 5,999,285
DATED : December 7, 1999
INVENTOR(S) : Brandt, et al.

It is certified that error appears in the above-identified patent and that said Letters Patent is hereby corrected as shown below:

The expression in claim 1 at Col. 8, line 64 should read:

state $|\psi_4\rangle$

Signed and Sealed this

Nineteenth Day of September, 2000

Attest:

Q. TODD DICKINSON

*Attesting Officer*　　　　*Director of Patents and Trademarks*